(12) United States Patent
Schnaufer et al.

(10) Patent No.: US 10,876,564 B2
(45) Date of Patent: Dec. 29, 2020

(54) BLIND RIVET NUT FOR THE CONNECTION OF TWO COMPONENTS

(71) Applicant: Bayerische Motoren Werke Aktiengesellschaft, Munich (DE)

(72) Inventors: Thomas Schnaufer, Oberhausen (DE); Andreas Beil, Munich (DE); Simon Spitzer, Munich (DE); Christian Berthold, Baierbach (DE); Robert Weinmann, Mindelheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/156,288

(22) Filed: Oct. 10, 2018

(65) Prior Publication Data

US 2019/0040893 A1 Feb. 7, 2019

Related U.S. Application Data

(63) Continuation of application No. 14/918,919, filed on Oct. 21, 2015, now abandoned, which is a (Continued)

(30) Foreign Application Priority Data

Jul. 22, 2013 (DE) .................. 10 2013 214 247

(51) Int. Cl.
*F16B 37/04* (2006.01)
*F16B 13/04* (2006.01)
(Continued)

(52) U.S. Cl.
CPC .............. *F16B 13/045* (2013.01); *F16B 5/02* (2013.01); *F16B 5/0621* (2013.01); *F16B 37/065* (2013.01)

(58) Field of Classification Search
CPC .............. F16B 19/1072; F16B 19/1045; F16B 19/1036; F16B 2019/1018; F16B 5/02; F16B 6/0275
(Continued)

(56) References Cited

U.S. PATENT DOCUMENTS

| 1,872,385 | A | * | 8/1932 | Andren | ................. | B21D 39/03 |
| | | | | | | 192/36 |
| 2,324,142 | A | * | 7/1943 | Eklund | ............... | F16B 19/1054 |
| | | | | | | 411/38 |

(Continued)

FOREIGN PATENT DOCUMENTS

CN 201636181 U 11/2010
DE 1 500 763 A1 3/1970
(Continued)

OTHER PUBLICATIONS

International Search Report (PCT/ISA/210) issued in PCT Application No. PCT/EP2014/064327 dated Oct. 17, 2014 with English translation (five pages).

(Continued)

*Primary Examiner* — Gary W Estremsky
(74) *Attorney, Agent, or Firm* — Crowell & Moring LLP

(57) ABSTRACT

A blind rivet nut for connecting two components by means of a screw connection includes a rivet shank. The rivet shank has an internal thread, at the axial first end of which a deformation portion configured to produce the riveted joint is arranged. At the axial second end of the rivet shank there is arranged a rivet head with a contact face that allows an adjacent component face to lie against. The supporting surface has a radial extent which is greater than or equal to 1.5 times and less than or equal to 2 times the radial extent of the rivet shank.

2 Claims, 4 Drawing Sheets

Related U.S. Application Data continuation of application No. PCT/EP2014/064327, filed on Jul. 4, 2014.

(51) Int. Cl.
  *F16B 5/02* (2006.01)
  *F16B 37/06* (2006.01)
  *F16B 5/06* (2006.01)

(58) Field of Classification Search
  USPC .......................................................... 411/533
  See application file for complete search history.

(56) References Cited

U.S. PATENT DOCUMENTS

| | | | | |
|---|---|---|---|---|
| 2,392,133 | A * | 1/1946 | Eklund | F16B 37/067 411/34 |
| 2,562,019 | A * | 7/1951 | Colley | F16B 37/067 411/38 |
| 2,763,314 | A * | 9/1956 | Gill | F16B 37/067 411/34 |
| 3,236,143 | A | 2/1966 | Wing | |
| 3,369,442 | A | 2/1968 | Darby et al. | |
| 3,461,771 | A * | 8/1969 | Briles | F16B 19/1054 411/34 |
| 3,667,340 | A * | 6/1972 | Black | F16B 19/008 411/38 |
| 3,750,525 | A * | 8/1973 | Waters | F16B 19/008 411/34 |
| 3,789,728 | A * | 2/1974 | Shackelford | F16B 37/067 411/34 |
| 3,834,270 | A * | 9/1974 | Triplett | F16B 13/061 411/38 |
| 3,916,970 | A * | 11/1975 | Owens | B60C 15/0226 152/379.4 |
| 3,942,407 | A * | 3/1976 | Mortensen | F16B 13/061 411/36 |
| 4,203,346 | A * | 5/1980 | Hall | F16B 19/1063 411/34 |
| 4,712,958 | A * | 12/1987 | Sparling | F16B 19/06 411/506 |
| 4,917,295 | A | 4/1990 | Matlock | |
| 5,018,789 | A * | 5/1991 | Sheckells | A47C 3/023 297/440.2 |
| 5,030,050 | A * | 7/1991 | Auriol | B21J 15/043 411/38 |
| 5,183,357 | A | 2/1993 | Palm | |
| 5,259,714 | A * | 11/1993 | Campbell | F16B 13/061 411/34 |
| 5,288,244 | A * | 2/1994 | Lien | H01R 12/7029 29/509 |
| 5,403,135 | A * | 4/1995 | Renner | B25B 27/0007 29/525.06 |
| 5,978,973 | A * | 11/1999 | Chartrand | A42B 3/20 2/422 |
| 6,109,849 | A * | 8/2000 | Nagayama | F16B 37/065 411/113 |
| 6,425,166 | B1 | 7/2002 | Seligman et al. | |
| 6,511,274 | B1 * | 1/2003 | Nagayama | F16B 37/065 411/179 |
| 6,746,191 | B2 * | 6/2004 | Edland | F16B 13/061 411/34 |
| 6,761,520 | B1 | 7/2004 | Dise | |
| 6,969,220 | B2 * | 11/2005 | Anquetin | F16B 13/001 411/38 |
| 7,189,163 | B2 * | 3/2007 | Nagayama | F16B 37/048 411/176 |
| 7,955,035 | B2 * | 6/2011 | Singh | F16B 5/04 411/34 |
| 8,226,339 | B2 * | 7/2012 | Neri | F16B 37/067 411/161 |
| 8,434,984 | B2 * | 5/2013 | Toosky | F16B 19/10 411/360 |
| 8,747,015 | B1 * | 6/2014 | Polewarczyk | F16B 33/002 403/384 |
| 9,303,673 | B2 * | 4/2016 | Sbongk | F16B 19/1054 |
| 2003/0185645 | A1 | 10/2003 | Leistner | |
| 2004/0244172 | A1 | 12/2004 | Elliott et al. | |
| 2005/0095078 | A1 | 5/2005 | Makino | |
| 2005/0201844 | A1 | 9/2005 | Davies et al. | |
| 2008/0038078 | A1 | 2/2008 | Ciulis et al. | |
| 2008/0193254 | A1 | 8/2008 | Selle et al. | |
| 2013/0223952 | A1 | 8/2013 | Hickey | |
| 2014/0068908 | A1 * | 3/2014 | Hickey | F16B 19/086 29/402.19 |

FOREIGN PATENT DOCUMENTS

| | | |
|---|---|---|
| DE | 199 62 595 A1 | 6/2001 |
| DE | 10 2006 021 842 A1 | 11/2007 |
| DE | 10 2012 015 144 A1 | 3/2013 |
| EP | 0 784 161 A1 | 7/1997 |
| EP | 0 936 362 A2 | 8/1999 |
| GB | 1135013 A | 11/1968 |

OTHER PUBLICATIONS

German Search Report issued in counterpart German Patent Application No. 10 2013 214 247.1 dated Feb. 17, 2014 with partial English translation (10 pages).

Chinese-language Office Action issued in counterpart Chinese Application No. 201480033038.7 dated Jun. 29, 2016 with English translation (16 pages).

\* cited by examiner

BLIND RIVET NUT FOR THE CONNECTION OF TWO COMPONENTS

CROSS REFERENCE TO RELATED APPLICATIONS

This application is a continuation of U.S. application Ser. No. 14/918,919, filed Oct. 21, 2015, which is a continuation of PCT International Application No. PCT/EP2014/064327, filed Jul. 4, 2014, which claims priority under 35 U.S.C. § 119 from German Patent Application No. 10 2013 214 247.1, filed Jul. 22, 2013, the entire disclosures of which are herein expressly incorporated by reference.

BACKGROUND AND SUMMARY OF THE INVENTION

The present invention relates to a blind rivet nut for the connection of two components by means of a screw connection, as well as to a component system having two components mutually connected by means of a blind rivet nut and a screw.

It is basically known that blind rivet nuts are used for the connection of two components. In this case, a known blind rivet nut is fastened to a first component in a rivet opening by way of a riveting operation. The blind rivet nut has an internal thread into which a screw can subsequently be screwed. The screw extends through a corresponding screw hole in a second component, so that a clamping connection of the two components with respect to one another can be established by way of the screw connection and the blind rivet nut.

It is a disadvantage in the case of known blind rivet nuts as well as in the case of known component systems that the transmission of force is not ensured in an ideal manner, particularly in the case of modern materials. Thus, there is basically the risk of force and tension peaks in high-load situations at such connection points. Risks occur with respect to increased component stress, particularly when one of the two materials or both materials of the two components consist of a composite fiber material, particularly CFRP or GFRP. Damage to individual fiber sections may occur in the respective composite fiber material.

It is an object of the present invention to eliminate the above-described disadvantages in a cost-effective and simple manner. In particular, it is an object of the present invention to ensure, in a cost-effective and simple manner, a transmission of force of the connection with increased requirement qualities with respect to demanding high-stress use situations.

This and other objects are achieved by a blind rivet nut for connecting two components via a screw connection, as well as by a component system having two component mutually connected by way of the blind rivet nut and a screw, in accordance with embodiments of the present invention. Characteristics and details, which are described in connection with the blind rivet nut according to the invention naturally also apply to the component system according to the invention and vice-versa, so that, with respect to the disclosure, reference can always be made or is always made in a reciprocal manner to the individual aspects of the invention.

A blind rivet nut according to the invention is used for connecting two components via a screw connection. For this purpose, the blind rivet nut has a rivet shaft with an internal thread, at whose axial end a deformation section is arranged for generating the rivet connection. A blind rivet nut according to the invention is characterized in that a rivet head is arranged at the axial second end of the rivet shaft, which rivet head has a bearing surface for supporting an adjacent component surface. The bearing surface has a radial dimension which is equal to or greater than 1.2 times the radial dimension of the rivet shaft.

In a known manner, the blind rivet nut according to the invention has a deformation section, which can be deformed by way of a threaded mandrel and thereby can establish the desired form-locking connection as the rivet connection between the blind rivet nut and a first component. For this purpose, the blind rivet nut is provided in its rivet shaft with a through opening in the axial direction. An internal thread is arranged in this through opening and, in particular, is constructed as a metric internal thread.

According to the invention, a rivet head is arranged at the second end of the rivet shaft, which rivet head explicitly provides a bearing surface for the transmission of force from an adjacent component surface. In a mounted situation, the second component therefore rests on the bearing surface of the rivet head, so that, by way of a screw connection via a screw, force can be applied to the second component and can be introduced by the latter into the bearing surface of the rivet head. The bearing surface is therefore used for the planar contacting of the adjacent component or of the adjacent component surface.

As a result of the enlargement of this bearing surface according to the invention to at least 1.2 times the radial dimension of the rivet shaft, an improved transmission of force is made available, particularly with a reduced surface pressure. This generates a larger-surface support, which is accompanied by a reduction of the component stress even in difficult or high usage situations under stress. Particularly in the case of tilt loads or torque loads of the screw connection at a blind rivet nut according to the invention, the enlarged bearing surface results in a reduction of tension peaks in the respective components. Furthermore, in this manner, an enlarged lever is provided so that, with a greater distance from the longitudinal axis of the blind rivet nut, a support against torques can be provided by way of the bearing surface.

The rivet shaft usually extends the same distance or a similar distance in the radial direction as the design of a corresponding riveting rivet opening in a pertaining first component. The bearing surface thereby corresponds to also essentially at least 1.2 times the radial dimension of such a rivet opening. It should be pointed out that a corresponding opening as well as the rivet shaft and the rivet head do not necessarily have to have a rotationally symmetrical cross-section. Rather, it may be advantageous to use other cross-sectional shapes. Thus, as will be explained below, outer contours or cross-sections which deviate from the circular shape are contemplated, particularly for the rivet head. For the rivet shaft itself, preferably a round outer contour is selected, in order to provide a rotationally symmetrical and correspondingly rotation-free insertion possibility into a corresponding rivet opening.

In the case of the internal thread, particularly a course is provided that extends over at least one section starting out from the rivet head. The rivet head itself is therefore also provided with a threaded opening, so that a screw can be screwed from this second end of the rivet shaft through the rivet head into the internal thread. The through opening may have a constant or differing cross-section. It is preferable for the internal thread to extend only to the deformation section and the deformation section is designed to be free of the internal thread. It is thereby ensured that, when establishing the rivet connection, if possible, no or only a slight influencing of the material in the internal-thread area is provided for the blind rivet nut at the first component.

According to the invention, two materials can be connected in this manner essentially independently of their actual material selection. In particular, a blind rivet nut of a metallic material can be used in order to also mutually connect modern materials in the form of fiber glass materials.

In the case of a blind rivet nut according to the invention, it may be advantageous for the radial dimension of the bearing surface to be between approximately 15 mm and approximately 22 mm. Preferably, the radial dimension of the bearing surface is between approximately 18 mm and approximately 20 mm. In particular, this relates to a rivet shaft with a radial dimension in the range between approximately 6 mm and approximately 10 mm. It is therefore preferred that the difference between the bearing surface and the rivet shaft, with respect to the respective radial dimension is clearly even greater than the minimum of 1.2. Factors are therefore preferred which are designed above approximately 1.5, particularly in the range of approximately 2, for the correlation between the radial dimension of the bearing surface and the radial dimension of the rivet shaft. The enlargement of the surface to this extent has the result that the advantages according to the invention of the reduction of the surface pressure and the improved support with respect to tilting torques are improved even further. Although a further enlargement would increase these advantages even more, it would, however, additionally create problems with respect to installation space, material expenditures and weight. The preceding limits can therefore be understood to be particularly advantageous and optimized values for the radial dimension of the bearing surface.

It is also advantageous in the case of the blind rivet nut according to the invention for the rivet head to have an outer contour that deviates from a circular shape. In this case, basically any outer contour that has no rotational symmetry is contemplated.

Particularly the outer contour along the axis has an essentially continuous or identical design, so that it can be better gripped manually or by way of a tool. In order to improve such an ability to be gripped, the outer surface of the outer contour may additionally have a so-called ribbing or knurling in order to improve frictional contact with a user's hand. This has the effect that, in the event of a defect of the blind rivet nut or a tearing-out of the internal thread, a drilling-out of the blind rivet nut can be facilitated. In such a case, an enlarged hole is drilled into the through opening of the blind rivet nut by means of a drill so that a reduction of the holding force of the deformation section is achieved. In order to avoid the blind rivet nut from rotating along with the drill head during the drilling operation, an outer contour deviating from the circular shape makes it easily possible in a cost-effective manner, that is as rapid as possible, to hold the rivet head and prevent a co-rotation.

In the case of an embodiment of a blind rivet nut according to the preceding description, it may be advantageous for the outer contour of the rivet head to have a metric hexagon shape. The same advantages as those described in the preceding paragraph are thereby achieved. In particular, the rivet head can be held firm by use of standard tools, so that an open-end wrench or a socket wrench can, for example be used. This further facilitates the handling of a blind rivet nut according to the invention.

In addition, it is advantageous, in the case of the blind rivet nut according to the invention, for the latter to be constructed at least in sections of a stainless material, particularly of high-grade steel. In the context of the present invention, stainless materials, in particular, are stainless metals. In this case, the entire rivet nut is preferably produced from a single piece or integrally from a single component. As a result, preferably the entire blind rivet nut is also constructed of a stainless material. In particular, V2A-type steel or V4A-type steel is used as the high-grade steel. Particularly in correlation with at least one component made of a composite fiber material, (such as CFRP and GFRP), corrosion resistance will be increased as a result of this embodiment. Because of the correlation with a CFRP component, a blind rivet nut made of metal will form an electrochemical cell. In order to reduce or completely eliminate the resulting high corrosion probability, a stainless material, particularly a high-grade steel, will have considerable advantages.

It is also advantageous, in the case of a blind rivet nut according to the invention, for the latter to, at least in sections, have a protective coating against corrosion. As explained in the preceding paragraph, corrosion is a principal risk, particularly when modern and particularly light materials, such as composite fiber materials, are used. Correspondingly, a protective coating can result in a corresponding protection against corrosion even in the case of inferior materials for the construction of the blind rivet nut. Naturally protective coatings can also be applied to individual sections of the blind rivet nut in order to provide explicit local protection. A combination with blind rivet nuts, which are constructed of stainless material at least in sections, is also contemplated by use of a protective coating according to the invention.

It may further be advantageous, in the case of a blind rivet nut according to the invention, for the rivet head to have, on the side oriented opposite the bearing surface, a sealing surface for sealing off a contacting component surface against the entry of liquid into the pertaining rivet opening. In other words, in the inserted and fastened condition, the blind rivet nut, with the rivet connection in the first component, will additionally provide a sealing effect with respect to the rivet shaft or rivet head and this first component. The sealing surface therefore contacts a corresponding adjacent component surface of the first component. In order to prevent particularly water from entering through this gap, this sealing surface can be provided, for example, by a corresponding surface structure of this side of the rivet head. It is also contemplated that the sealing surface is constructed as a coating on this side of the rivet head, which is applied to the latter, for example, in a liquid or at least flowable state. A further improvement is thereby achieved, particularly with respect to the resistance to corrosion.

Another object of the present invention is a component system having a first component with a rivet opening and a second component with a screw opening. A component system according to the present invention is characterized in that a blind rivet nut according to the present invention is fastened in the rivet opening. In this case, a screw extends through the screw opening of the second component and is screwed into the internal thread of the rivet shaft. Furthermore, a first component surface of the second component rests on the bearing surface of the rivet head. By the use of a blind rivet nut according to the invention, the same advantages are achieved in the case of a component system according to the invention as those explained in detail with respect to a blind rivet nut according to the invention. The two components are preferably produced of modern and light materials. In particular, the first component is made of a composite fiber material (CFRP or GFRP). A plastic component may, for example, be used as a second component. The two components are therefore fastened to one another in that the blind rivet nut provides a corresponding threaded connection possibility at the first component. By use of the screw, a clamping-in of the second component will then take place between the fastened blind rivet nut and the screw head.

A component system according to the invention can be further developed such that a shim is arranged between a screw head of the screw and a second component surface of the second component. In this case, the radial dimension of the bearing of the rivet head is greater than or equal to a radial dimension of the shim. An even further improved force transmission situation is thereby provided. Particularly during the transmission of tilt torques between the screw and the blind rivet nut, an improved support with an enlarged lever for the bearing surface of the blind rivet nut becomes possible in this manner.

A further advantage can be achieved when, in the case of a component system according to the invention, the screw opening is designed with a geometric dimension which, widthwise, is smaller and lengthwise is larger than the radial dimension of the bearing surface of the rivet head. In a manner of speaking, this provides an oblong-hole functionality for the screw opening which allows a lengthwise adjustability. A relative positioning can thereby permit higher admissible tolerances during the manufacturing of the two components. In other words, although the shaft of the screw can project through this screw opening, this opening blocks a passing-through of the rivet head by the smaller radial dimension widthwise.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
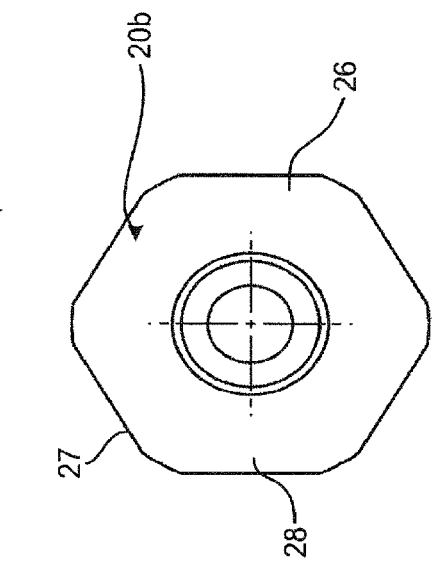
FIG. 2 is a schematic top view of the embodiment of FIG. 1.
Figure 1:
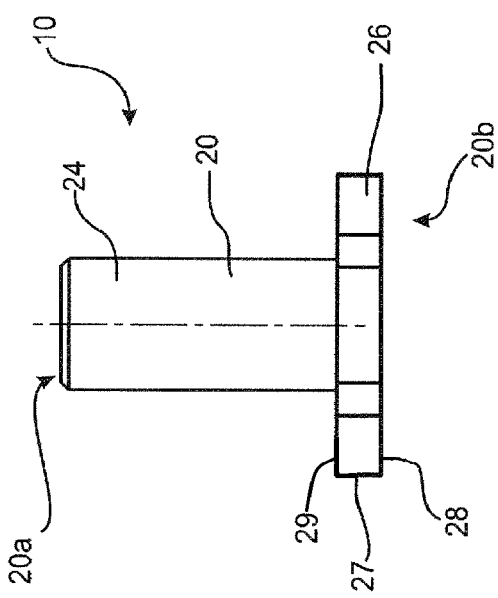
FIG. 1 is a schematic view of a first embodiment of a blind rivet nut according to the invention.

FIGS. 1 and 2 illustrate a first embodiment of a blind rivet nut 10 according to the invention. This blind rivet nut 10 is designed with a rivet shaft 20, on whose first end 20a a deformation section 24 is arranged. A rivet head 26 is situated at the second end 20b of the rivet shaft 20. As particularly well illustrated in FIG. 2, the rivet head 26 has an outer contour 27, which deviates from the circular shape and is provided here as a hexagon in a metric design.

It is not visible in these two figures that a through bore is provided through the entire axial dimension of the rivet shaft 20. A corresponding internal thread is arranged in this rivet shaft 20. As further illustrated in FIGS. 1 and 2, the radial dimension of the rivet head 26 is a clearly larger geometric dimension than that of the rivet shaft 20. As a result, the advantages according to the invention are achieved. Furthermore, a sealing surface 29 is arranged on the surface of the rivet head 26 oriented opposite the bearing surface 28 of the rivet head 26. As will be explained below, this sealing surface 29 is used for a corresponding additional sealing.

Figure 3:
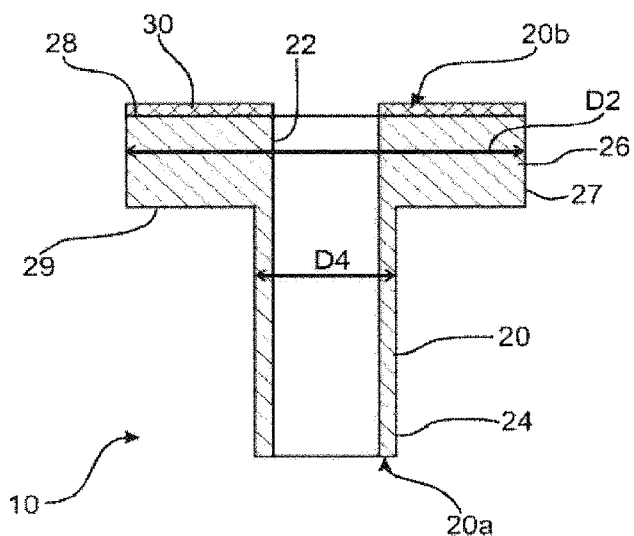
FIG. 3 is a schematic view of further embodiment of a blind rivet nut according to the invention.
Figure 4:
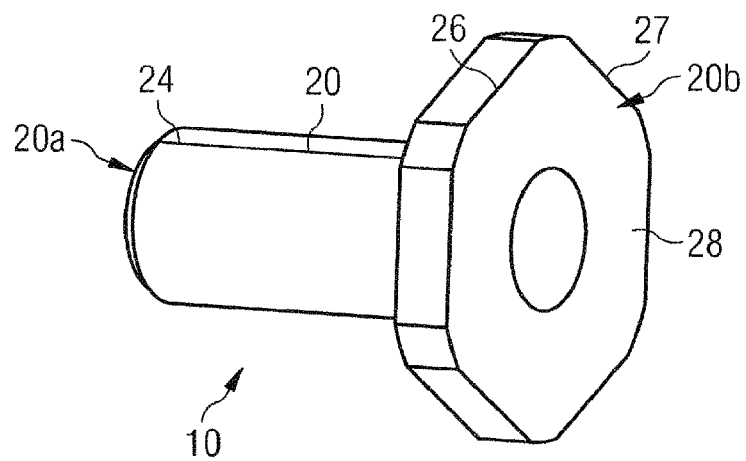
FIG. 4 is a schematic perspective view of the embodiment of FIG. 3.

In the embodiments of FIGS. 3 and 4, the relationship between the radial dimension D2 of the bearing surface 28 and the radial dimension D4 of the rivet shaft 20 is easily visible. The through bore with the corresponding design of the internal thread 22 is also easily recognizable here. In addition, on the bearing surface 28 of the rivet head 29, a protective coating 30 is provided for protection against corrosion. In combination or as an alternative, the material of the blind rivet nut 10 is a stainless material, particularly high-grade steel.

Figure 5:
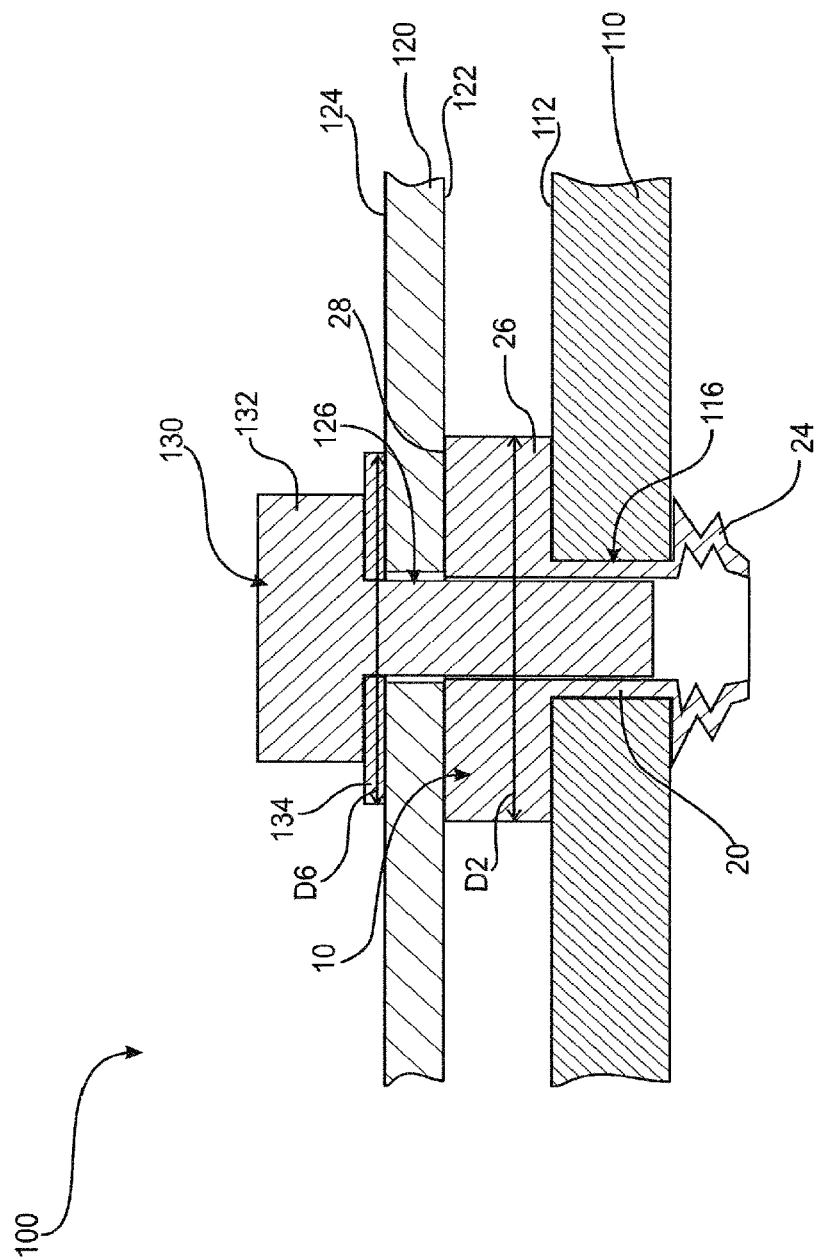
FIG. 5 is a schematic perspective view of an embodiment of a component system according to the invention.

FIG. 5 illustrates the installation situation for constructing a component system 100. The two components 110 and 120 are fastened to one another. Component 110 preferably is a composite fiber material component made of CFRP or GFRP. The second component 120 particularly is made of a plastic material. The blind rivet nut 10 was fastened in the rivet opening 116 of the first component 110 in a form-locking manner by deformation of the deformation section 24. In this case, the sealing surface 29 has also arrived at a contacting stop against the opposite and adjacent component surface 112 of the first component 110. The adjacent first component surface 120 of the second component 120 now rests on the bearing surface 28 of the rivet head 26. A shim 134 is arranged on the second component surface 124, which shim 134 is pressed on by the screw head 132 of a screw 130. This screw 130 extends through the corresponding screw opening 126 and is screwed into the internal thread 22 in the blind rivet nut 10. As easily visible in FIG. 5, a correlation is provided here between the radial dimension D6 of the shim 134 and the radial dimension D2 of the bearing surface 28 such that the radial dimension of the bearing surface has a larger construction. This results in a further improved torque support. Furthermore, the bearing surface 28 is designed here for permitting a sliding of the first component surface 122. This permits the compensation of expansion differences at different temperature expansion coefficients. Also, as a result of the large radial dimension D2 of the bearing surface 28, a tolerance compensation between the two components 110 and 120 becomes possible.

Figure 6:
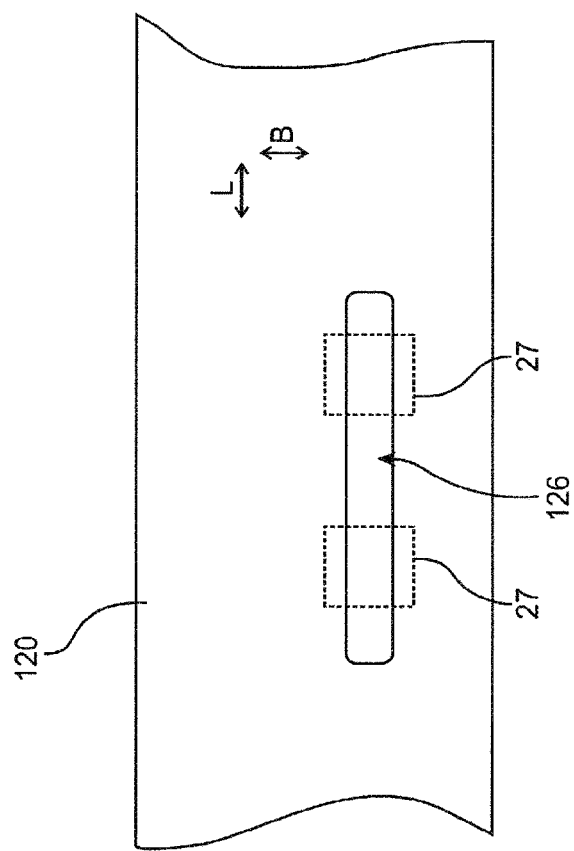
FIG. 6 is a schematic top view of a screw opening in a second component.

The top view of the second component 120 in FIG. 6 illustrates a contemplated construction of the screw opening 126. The latter has different dimensions lengthwise L and widthwise B. The positions of a blind rivet nut 10 arranged below the second component 120 are indicated by broken lines. In particular, a square outer contour 27 of the pertaining rivet head 26 is shown here. The two different positions indicate that screw openings 126 in the shape of an oblong hole permit an adjustability of the relative positioning of the second component 120 with respect to the first component 110 along the longitudinal direction.

LIST OF REFERENCE SYMBOLS

10 Blind rivet nut
20 Rivet shaft
20a First end
20b Second end
22 Internal thread
24 Deformation section
26 Rivet head 27 Outer contour of rivet head
28 Bearing surface
29 Sealing surface
30 Protective coating
100 Component system
110 First component
112 Component surface
116 Rivet opening
120 Second component
122 First component surface
124 Second component surface
126 Screw opening
130 Screw
132 Screw head
134 Shim
D2 Radial dimension of the bearing surface
D4 Radial dimension of the rivet shaft
D6 Radial dimension of the shim
B Width direction
L Longitudinal direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for connecting two components, the system comprising:
    a first component that is made of a composite material, the composite material being either CFRP or GFRP;
    a second component that is made of a plastic material;
    a rivet nut having a shank section and a head section, the head section: i) having a non-circular shape, and ii) being defined at a first axial end of the blind rivet nut which contacts the second component, wherein at a second axial end the blind rivet nut the shank section defines riveted joint that contacts the first component; and
    a screw that is inserted into the blind river nut, wherein the first and second components lie on opposing sides of the head; and
    wherein a radial extent of the head section is 1.2 times larger than a radial extent of the shank section; and
    wherein the screw has a head and the system further comprises a shim that is interposed between the head of the screw and the second component.

2. The system according to claim 1, wherein a radial extent of the head of the screw and a radial extent of the shim are smaller than the radial extent of the head section of the blind rivet nut.

* * * * *